United States Patent [19]
Schimmel et al.

[11] Patent Number: 4,713,229
[45] Date of Patent: Dec. 15, 1987

[54] PROCESS FOR PURIFYING PHOSPHORIC ACID

[75] Inventors: Günther Schimmel; Reinhard Gradl, both of Erftstadt, Fed. Rep. of Germany

[73] Assignee: Hoechst Aktiengesellschaft, Fed. Rep. of Germany

[21] Appl. No.: 774,084

[22] Filed: Sep. 9, 1985

[30] Foreign Application Priority Data

Sep. 21, 1984 [DE] Fed. Rep. of Germany ....... 3434611

[51] Int. Cl.$^4$ .................. C01B 25/14; C01B 25/16
[52] U.S. Cl. .................. 423/321 R; 423/304; 423/321 S
[58] Field of Search ............ 423/321 R, 321 S, 304

[56] References Cited

U.S. PATENT DOCUMENTS

| 3,635,661 | 1/1972 | Beckham | 423/321 S |
| 3,993,733 | 11/1976 | Irani | 423/321 S |
| 4,164,550 | 8/1979 | Hill | 423/321 R |
| 4,256,716 | 3/1981 | Sikdar | 423/321 R |
| 4,275,038 | 6/1981 | Sikdar et al. | 423/321 S |
| 4,452,768 | 6/1984 | Gradl et al. | 423/321 S |
| 4,466,948 | 8/1984 | Schimmel et al. | 423/321 R |
| 4,503,016 | 3/1985 | Schimmel et al. | 423/321 S |

FOREIGN PATENT DOCUMENTS 763871 7/1967 Canada ..................... 423/321 R

Primary Examiner—John Doll
Assistant Examiner—Robert M. Kunemund
Attorney, Agent, or Firm—Connolly and Hutz

[57] ABSTRACT

Wet process phosphoric acid is freed from heavy metal ions, especially from ions of cadmium, copper, mercury, lead and arsenic and optionally also from organic compounds and sulfuric acid. To this end, the phosphoric acid is contacted with a diorganyldithiophosphoric acid ester and an adsorbent, if desired. Prior to or after said treatment with the ester, the phosphoric acid is admixed with a reductant. The adsorbent, if any is used alone or in combination with an alkaline earth metal compound soluble in phosphoric acid.

9 Claims, No Drawings

PROCESS FOR PURIFYING PHOSPHORIC ACID

The present invention relates to a process for purifying phosphoric acid containing from 3 to 80 wgt % $P_2O_5$, especially for removing ions of cadmium, copper, mercury, lead and arsenic and optionally also organic compounds and sulfuric acid from wet process-phosphoric acid. To this end, the phosphoric acid is contacted either with a diorganyldithiophosphoric acid ester or with a mixture of an adsorbent and the ester, or it is contacted, prior to or after the treatment with the ester, with the adsorbent alone and the phase containing the purified acid is separated from the phase containing the ester.

A feature of great ecological importance is the removal of ions of cadmium, copper and arsenic from phosphoric acids as these are predominantly used for making fertilizers, animal feed agents and detergent compositions, and the like.

The removal of organic contaminants from phosphoric acid prior to subjecting it to purification by extraction or precipitation may also turn out necessary (a) to avoid the annoying formation of an emulsion and (b) to obtain a final product complying with standard purity specifications.

Various processes for removing heavy metals and arsenic from wet process-phosphoric acid with the aid of a dithiophosphoric acid ester have already been described in the art. German Specification DE-OS No. 31 27 900 discloses a process for extracting heavy metals from green phosphoric acid, already freed from organic contaminants, by means of a solution of a diorganyldithiophosphoric acid ester. This process combines the obligatory use of a prepurified phosphoric acid with the disadvantage of using very elaborate equipment which is needed for recycling the organic phase including the steps of washing, reextracting and working up the aqueous reextract phase. In addition, arsenic is but insufficiently removed.

Still further, the reaction must be effected at room temperature or at a slightly higher temperature; failing this, the distribution coefficients decrease too seriously. Customarily, however, the acid processed and prepurified from organic contaminants is maintained at a temperature of 60° to 80° C. at which it presents an improved filterability.

German Specification DE-OS NO. 32 02 658 related to U.S. Pat. No. 4,452,768 discloses a process for freeing crude phosphoric acid from heavy metals by means of a mixture consisting of a diorganyldithiophosphoric acid ester and an adsorbent. This process is technically easy to carry out with the use of minor quantities of dithiophosphoric acid ester. However, it suffers from the disadvantage that sufficiently low heavy metal values are obtained only at room temperature or at a temperature slightly higher than room temperature. On the other hand, the filtrate output is as insufficient as the removal of arsenic, at these low temperatures.

To avoid this, it is suggested in German Specification DE-OS No. 32 27 202, related to U.S. Pat. No. 4,466,948 that the acid should be treated at two different temperatures, namely initially at a temperature higher than 50° C. for removing arsenic, and then, after cooling, at a temperature lower than 50° C. for extracting the heavy metals. It is true that this process gives phosphoric acid with satisfactory low heavy metal and arsenic values; yet, it has two disadvantages, which reside (1) in the fact that the steps of additionally cooling and reheating the acid involve high energy costs and (2) in the fact that the process requires the filtration to be effected at low temperatures with the result that the filtrate output is unsatisfactory.

We have now unexpectedly found that the prior processes referred to hereinabove can be improved and their disadvantages avoided by admixing the phosphoric acid, prior to treating it with the dithiophosphoric acid ester, with a reductant and, in the event of an adsorbent being used, using it either alone or in combination with an alkaline earth metal compound soluble in phosphoric acid.

Useful reductants are all those substances which act as a reductant in a phosphoric acid solution, e.g. iron, zinc, red phosphorus, iron(II)sulfate, sodium hypophosphite, hydrazine or a hydroxymethane sulfinate, etc. They should be used in quantities of 0.1 to 3.0 wgt %, based on the quantity of phosphoric acid.

The diorganyldithiophosphoric acid esters should conveniently be selected from dialkyl esters, preferably from those which have a mean chain length of 4-12 carbon atoms in the alkyl group, more preferably from the octyl, isooctyl or 2-ethylhexyl esters, which should be used for the extraction in a quantity of 0.05 to 0.5 wgt %, based on the quantity of phosphoric acid.

It is possible to use either carbonaceous adsorbents, e.g. active carbon, carbon black, an adsorber resin of macroporous plastics matter or to use adsorbents containing silicate, e.g. zeolite, bentonite, perlite, diatomaceous earth, precipitated silicic acid or a calcium silicate insoluble in phosphoric acid.

Calcium compounds, such as apatite, $CaCO_3$, $CaO$ or $Ca(OH)_2$ should preferably be used as the alkaline earth metal compounds soluble in phosphoric acid.

The adsorbents should be used in quantities of 0.1 to 2.0 wgt %, and the calcium compound should be used in quantities of 0.5 to 5.0 wgt %, the percentages being based on the quantity of phosphoric acid.

The nature and quantity of the addends used depend on the particular process employed, the composition of the phosphoric acid and the purity specifications.

In the event of a so-called "black crude acid" being used, it is possible, for example, to proceed as follows:

1. After having been admixed with reductant, the crude phosphoric acid is treated with active carbon and a calcium compound and the suspension is filtered. The filtrate is treated and extracted using a dialkyldithiophosphoric acid (pure or diluted in an inert solvent). Next, the phases are separated or, in the event of the pure ester having been used, the phosphoric acid is admixed with an adsorbent having the nature of a silicate, and the purified acid is obtained by filtration.

2. The crude black phosphoric acid is admixed with the reductant. Next, the dithiophosphoric acid is added first and then the adsorbent. If it is desirable to have phosphoric acid containing very little residual $C_{org}$. contaminants, e.g. for purifying it by extraction, it is good practice to admix the acid with a carbonaceous adsorbent, e.g. active carbon and optionally with a soluble calcium compound and then to filter it off from the heavy metal residue and gypsum.

If no particularly pure acid is required to be used, it is good practice to admix the acid with a silicate-containing adsorbent, e.g. perlite, then to filter it off. This can be done, e.g. in all those cases in which the acid is made into animal feed agents or fertilizers.

The two processing steps described above can also be combined with one another. In this event, the acid is after-treated with a carbonaceous adsorbent and optionally a calcium compound, after separation of the silicate-containing filter cake. The process of this invention offers a series of advantages:

(a) By subjecting the acid to the combined acid treatment with the reductant and diorganyldithiophosphoric acid ester, it is possible considerably more effectively to remove the heavy metals than heretofore, due to complex formation. As a result, smaller quantities of ester are required to be used which means an economy of material.

In addition, it is possible to effect the extraction at higher temperatures (higher than 50° C.) the distribution coefficients remaining substantially unaffected. After the reducing treatment, it is possible to achieve a 99% Cd-deconcentration even at 90° C., for example, i.e. under conditions under which Cd normally ceases to be extracted.

(b) By treating the acid with the reductant, it is possible considerably more effectively to remove the arsenic, than heretofore: concentrated crude acids containing more than 45 wgt % $P_2O_5$ can be effectively dearsenified to less than 0.5 ppm within the entire temperature range of 20° to 100° C. To achieve the same result by the process described in German Specification DE-OS No. 32 27 202, it is invariably necessary to use temperatures of more than 50° C. In addition, the deconcentration rates are lower in the prior art processes. But even the process disclosed in DE-OS No. 32 27 202 was found to be insufficiently effective for "filter-grade acid" containing about 30 wgt % $P_2O_5$ which is often directly processed without being further concentrated (cf. examples). When subjected to the reducing treatment of this invention, the acid was practically always found to have been dearsenicated to less than 1 ppm As.

(c) The treatment with the reductant makes the deconcentration rate of $C_{org.}$ contaminants increase during the treatment with the adsorbent, especially in the event of active carbon being used as the adsorbent. This is of particular importance in all those cases in which it is desirable for a black acid to be freed not only from heavy metals and arsenic but also from organic contaminants.

(d) The combined treatment of this invention permits acid having a high degree of purity to be effectively obtained in simple fashion. It is more particularly possible to use phosphoric acids of practically all commercially interesting $P_2O_5$-concentrations within the range 25 to 60 wgt % and at a given uniform temperature level produce phosphoric acid therefrom prepurified to an optimum extent from heavy metals, arsenic and organic impurities.

The process of this invention can more particularly be used for prepurifying phosphoric acids which are intended for purification by extraction. At uniformly high temperatures of 60° to 90° C., it is possible successively to separate the heavy metals, deconcentrate the $C_{org.}$ contaminants and effect the desulfatization. As a result, the process is easier to carry out and the filtration can be effected within a temperature range within which phosphoric acid is well filterable due to its lower viscosity.

The following Examples illustrate the invention which is naturally not limited thereto.

EXAMPLES 1, 2, 5, 6 (cf. Table 1)

Various crude phosphoric acids were reduced under the conditions specified in Table 1 for 1 hour at 60° C. by means of iron powder, stirred initially for 30 minutes with pure bis(2-ethylhexyl)-dithiophosphoric acid ester and then for 5 minutes with commercially available perlite. Next, the whole was filtered at a difference pressure of 1 bar using a pressure filter layered with a precoat-layer (perlite) 8 mm high, and the contents of Cd, Cu and As in the filtrate were determined.

EXAMPLES 3, 4, 7, 8 (comparative Examples, cf. Table 1)

The procedure was as described in the preceding Examples save that the treatment with the reductant was omitted.

EXAMPLES 9–12

The procedure was as described in Example 6 but the iron reductant was replaced by the reductants specified in Table 2 which were stirred into the acid at 70° C.

EXAMPLE 13

Black Florida crude phosphoric acid containing 51.5 wgt % $P_2O_5$, 4.3 wgt % $SO_4$, 10 ppm Cd, 5 ppm As, 7 ppm Cu, 0.03 ppm Hg, 0.2 ppm Pb and 1600 ppm $C_{org.}$ was treated for 1 hour at 60° C. with 1 wgt % iron powder. Next, the acid was admixed with 3 wgt %, based on $P_2O_5$, commercially available pulverulent active carbon and with 7 wgt %, based on $P_2O_5$, hydrate of lime and the mixture was stirred for 1 h at 70° C. After filtration, a clear green acid was obtained which contained 50.3 wgt % $P_2O_5$, 0.15 wgt % $SO_4$, 10 ppm Cd, 5 ppm As and 130 ppm $C_{org.}$. The acid was successively admixed, each time over a period of 15 minutes, with 0.2 wgt % bis(2-ethylhexyl)-dithiophosphoric acid ester and 1 wgt % perlite. Next, the whole was filtered while hot with the aid of a precoat layer of perlite. The acid so purified was analyzed and found to contain 50.2% $P_2O_5$, 0.15% $SO_4$, less than 1 ppm Cd, less than 0.5 ppm Cu, 0.001 ppm Hg, 0.01 ppm Pb, 0.1 ppm As and 140 ppm $C_{org.}$.

EXAMPLE 14 (comparative Example)

The procedure was as described in Example 13 but no reducing iron was added. The purified acid was analyzed and found to contain (the values determined for the first purification stage are indicated in brackets): 50.4 (50.4) wgt % $P_2O_5$; 0.15 (0.15) wgt % $SO_4$; 5 (10) ppm Cd; 0.5 (5) ppm As and 470 (440) ppm $C_{org.}$.

EXAMPLE 15 (comparative Example)

Prepurified green Morocco phosphoric acid (49.8 wgt % $P_2O_5$; 0.5 wgt % $SO_4$; 110 ppm $C_{org.}$; 24 ppm Cd and 9 ppm As) was extracted over a period of 20 minutes at 40° C. with a 20 wgt % solution of bis-(2-ethylhexyl)-dithiophosphoric acid ester in kerosene at a phase ratio A:O=50:1. Next, the whole was allowed to deposit and the acid/raffinate-phase was investigated. It contained 5 pmm Cd and 5 ppm As.

EXAMPLE 16

In modifying the procedure of Example 15, the green acid was reduced prior to extracting it, over a period of 2 hours at 40° C. with 0.5 wgt % iron powder. After the extraction, it was found to contain less than 1 ppm Cd and 0.2 ppm As.

TABLE 1

| Ex. | Acid | Quant. in wgt %/based on acid of | | | Temperature (°C.) | Purified acid, content of, in ppm | | |
|---|---|---|---|---|---|---|---|---|
| | | iron | thio-ester | per-lite | | Cd | As | Cu |
| 1 | A | 0.4 | 0.1 | 0.1 | 40 | <1 | <1 | <0.5 |
| 2 | A | 0.4 | 0.1 | 0.1 | 80 | <1 | <0.3 | <0.5 |
| 3 | A | 0 | 0.1 | 0.1 | 40 | <1 | 5 | <0.5 |
| 4 | A | 0 | 0.1 | 0.1 | 80 | 6 | 4 | 2 |
| 5 | B | 0.5 | 0.2 | 0.5 | 30 | <1 | 0.5 | <0.5 |
| 6 | B | 0.5 | 0.2 | 0.5 | 80 | <1 | 0.2 | <0.5 |
| 7 | B | 0 | 0.2 | 0.5 | 30 | <1 | 4 | <0.5 |
| 8 | B | 0 | 0.2 | 0.5 | 80 | 17 | <1 | 3 |

A: Black Florida-crude acid; 29% $P_2O_5$; 6 ppm Cd; 5,5 ppm As; 9 ppm Cu
B: Black Morocco-crude acid; 52% $P_2O_5$; 22 ppm Cd; 8 ppm As; 39 ppm Cu

TABLE 2

| Ex. | Reductant | | Acid treated, content of, in ppm | |
|---|---|---|---|---|
| | Type | Quant. in wgt %/based on acid | Cd | AS |
| 9 | iron(II)sulfate | 0.6 | <1 | 0.5 |
| 10 | rongalite | 0.2 | <1 | 0.1 |
| 11 | red phosphorus | 0.6 | <1 | 0.5 |
| 12 | zinc | 0.6 | <1 | 0.1 |

We claim:

1. In a process for purifying phosphoric acid containing from 3 to 80 weight % $P_2O_5$, especially for removing ions of cadium, copper, mercury, lead and arsenic and optionally also organic compounds and sulfuric acid from wet process phosphoric acid, wherein the phosphoric acid is contacted either with a diorganyldithiophosphoric acid ester or with a mixture of an adsorbent and said ester or, prior to or after said treatment with the ester, is contacted with the adsorbent alone and the phase containing the purified phosphoric acid is separated from the phase containing the ester, the improvement which comprises: admixing the phosphoric acid with a reductant prior to treating it with the dithiophosphoric acid ester and, in the event of an adsorbent being used, using the adsorbent alone or in combination with an alkaline earth metal compound soluble in phosphoric acid, whereby cadmium, arsenic and copper contaminants are effectively removed.

2. The process as claimed in claim 1, wherein the reductant is selected from iron, zinc, red phosphorus, iron(II)-sulfate, sodium hypophosphite, hydrazine or hydroxymethane sulfinates.

3. The process as claimed in claim 1, wherein the adsorbent is a carbonaceous agent selected from active carbon or carbon black, an adsorber resin and/or a silicate-containing agent selected from zeolite, bentonite, perlite, diatomaceous earth, precipitated silicic acid, or a calcium silicate insoluble in phosphoric acid.

4. The process as claimed in claim 1, wherein the alkaline earth metal compound soluble in phosphoric acid is apatite, $CaCO_3$, $CaO$ or $Ca(OH)_2$.

5. The process as claimed in claim 1, wherein the phosphoric acid is successively contacted with a carbonaceous adsorbent and a silicate-containing adsorbent or inversely, and solid matter is separated prior to contacting the acid with the respective second adsorbent.

6. The process as claimed in claim 1, wherein the reductant is used in a quantity of 0.1 to 3.0 wgt %, based on the quantity of phosphoric acid.

7. The process as claimed in claim 1, wherein a temperature of 60° to 90° C. is maintained.

8. The process as claimed in claim 1, wherein the dithiophosphoric acid ester is used in a quantity of 0.05 to 0.5 wgt %, based on the quantity of phosphoric acid.

9. The process as claimed in claim 1, wherein the adsorbent is used in a quantity of 0.1 to 2.0 wgt %, based on the quantity of phosphoric acid.

* * * * *